Patented Feb. 22, 1949

2,462,654

UNITED STATES PATENT OFFICE 2,462,654

TRIFLUOROMETHYLHEXACHLOROCYCLOHEXANE

Earl T. McBee, La Fayette and Lavon D. Bechtol, Indianapolis, Ind., assignors to Purdue Research Foundation, West Lafayette, Ind., a corporation of Indiana No Drawing. Application June 15, 1946, Serial No. 677,082

1 Claim. (Cl. 260—648)

This invention relates to a new composition of matter, more specifically to the compound trifluoromethylhexachlorocyclohexane.

This compound has unusual stability, a high boiling point (due to the number of chlorine atoms present in the molecule), and a low freezing point. These qualities, stability and a wide liquid range, make the compound useful as a dielectric, heat-transfer fluid, and insulating liquid in electrical equipment, with a special application in the latter field to transformer fluids. Trifluoromethylhexachlorocyclohexane is also useful as a chemical intermediate and as an insecticide.

The compound may be prepared by the liquid phase chlorination of benzotrifluoride, as in Carius tube at room temperature utilizing a considerable reaction period.

The following example illustrates a method by which the new compound may be prepared, but is not to be construed as limiting.

Twenty-two grams (0.15 mole) of purified benzotrifluoride was added slowly to 71 grams (1 mole) of liquid chlorine contained in a Carius tube at a temperature of −70 degrees centigrade. The tube was then sealed and the temperature raised slowly to the temperature of the room, where it was maintained for two weeks. At the end of this time, the tube was again cooled to −70 degrees centigrade and opened. Chlorine was allowed to evolve slowly from the reaction product. The remaining liquid weighed 51 grams and possessed an odor peculiar to polychloroaliphatic and polychloroalicyclic compounds. The gain in weight was equivalent to the addition of 5.5 atoms of chlorine to the molecule. The organic product was then distilled under reduced pressure from a Claisen flask, yielding five grams of material boiling between 120–143 degrees centigrade and 25 grams boiling at 143–145 degrees centigrade, both at 4 millimeters of mercury pressure absolute. The latter fraction was twice analyzed and produced the following comparisons:

|  | Per Cent F | Per Cent Cl |
|---|---|---|
| Found (1) | 15.4 | 59.9 |
| Found (2) | 15.7 | 59.8 |
| Theoretical for trifluoromethylhexachlorocyclohexane | 15.87 | 59.64 |

The density of trifluoromethylhexachlorocyclohexane is 1.846 at 25 degrees centigrade.

We claim:
Trifluoromethylhexachlorocyclohexane.

EARL T. McBEE.
LAVON D. BECHTOL.

REFERENCES CITED

The following references are of record in the file of this patent:

UNITED STATES PATENTS

| Number | Name | Date |
|---|---|---|
| 2,062,743 | Daudt et al. | Dec. 1, 1936 |
| 2,063,979 | Booth | Dec. 15, 1936 |
| 2,174,512 | Holt et al. | Oct. 3, 1939 |

OTHER REFERENCES

Van der Linden, "Rec. trav. chim. des. Pays. Bas.," vol. 57, pages 1075–1086 (1938).

Simons et al., "J. A. C. S.," vol. 61, pages 2962–66 (1939).

"Chem. Abstracts," vol. 17, page 75 (1923) Abstracting article by Swarts in "Bull. acad. roy. Belg." 1922, 331–43.